US011368309B2

(12) United States Patent
Xu

(10) Patent No.: US 11,368,309 B2
(45) Date of Patent: Jun. 21, 2022

(54) METHODS AND DEVICES FOR GENERATING AND VERIFYING PASSWORDS

(71) Applicant: Alipay (Hangzhou) Information Technology Co., Ltd., Zhejiang (CN)

(72) Inventor: Hui Xu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/130,892

(22) Filed: Dec. 22, 2020

(65) Prior Publication Data

US 2021/0281417 A1 Sep. 9, 2021

Related U.S. Application Data

(63) Continuation of application No. PCT/CN2020/078222, filed on Mar. 6, 2020.

(51) Int. Cl.
*H04L 9/32* (2006.01)
*H04L 9/08* (2006.01)
(52) U.S. Cl.
CPC .......... *H04L 9/3231* (2013.01); *H04L 9/0863* (2013.01); *H04L 2209/38* (2013.01)
(58) Field of Classification Search
CPC .. H04L 9/3231; H04L 9/0863; H04L 2209/38
See application file for complete search history.

(56) References Cited

U.S. PATENT DOCUMENTS 9,258,118 B1 * 2/2016 Roth ................... H04L 9/0872
9,565,020 B1 * 2/2017 Camenisch ......... H04L 63/0815
(Continued)

FOREIGN PATENT DOCUMENTS

CN 105450413 A 3/2016
CN 105812366 A 7/2016
(Continued)

OTHER PUBLICATIONS

Johansen, Alison Grace. "Biometrics and Biometric Data: What Is It and Is It Secure?" Official Site, NortonLifeLock, Feb. 8, 2019, Accessed Jul. 7, 2021, us.norton.com/internetsecurity-iot-biometrics-how-do-they-work-are-they-safe.html. (Year: 2019).*
(Continued)

*Primary Examiner* — Oleg Korsak
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for generating and verifying password. One of the methods includes: receiving a password setup request, the password setup request including a list identifying at least one verifier and data representing a user-provided password; forming a basis password based on the user-provided password; generating a plurality of system-generated passwords based on the basis password; encrypting the plurality of system-generated passwords to generate a plurality of encrypted passwords including a first encrypted password; submitting the plurality of encrypted passwords to a blockchain system for recordation; and providing a first address of the first encrypted password on the blockchain system to a first verifier identified in the list.

18 Claims, 6 Drawing Sheets

(56) References Cited

U.S. PATENT DOCUMENTS

| | | | |
|---|---|---|---|
| 9,985,964 B2* | 5/2018 | Andrade | G06F 21/30 |
| 10,057,065 B2* | 8/2018 | Reinhold | H04L 9/0863 |
| 10,103,878 B1 | 10/2018 | Sharifi Mehr | |
| 10,339,523 B2* | 7/2019 | McDonough | G06Q 20/38215 |
| 10,642,967 B2* | 5/2020 | Balaraman | G06F 21/64 |
| 10,685,353 B2* | 6/2020 | Burke | H04L 9/0861 |
| 10,728,027 B2* | 7/2020 | Fiske | H04L 9/3231 |
| 10,902,138 B2* | 1/2021 | Cheung | H04L 9/0863 |
| 11,251,958 B2* | 2/2022 | Widmann | G06K 9/6264 |
| 2010/0263029 A1* | 10/2010 | Tohmo | H04L 9/0863 726/6 |
| 2013/0125221 A1* | 5/2013 | Agrawal | H04L 9/0863 726/6 |
| 2016/0275461 A1* | 9/2016 | Sprague | G06Q 20/0655 |
| 2016/0379330 A1* | 12/2016 | Powers | G06F 21/64 382/100 |
| 2018/0218176 A1* | 8/2018 | Voorhees | H04L 9/3213 |
| 2019/0036698 A1 | 1/2019 | Anglin et al. | |
| 2019/0163896 A1 | 5/2019 | Balaraman et al. | |
| 2019/0179806 A1* | 6/2019 | Reinsberg | H04L 9/3255 |
| 2019/0220590 A1* | 7/2019 | De Jonge | H04L 9/3226 |
| 2020/0052899 A1 | 2/2020 | Finlow-Bates | |
| 2020/0219094 A1* | 7/2020 | Dikhit | H04L 9/0894 |
| 2021/0051015 A1* | 2/2021 | Widmann | G06K 9/6264 |
| 2021/0218565 A1* | 7/2021 | Flatow | H04L 9/0662 |
| 2021/0273801 A1* | 9/2021 | Vogel | H04L 9/3242 |

FOREIGN PATENT DOCUMENTS

| | | |
|---|---|---|
| CN | 108701136 A | 10/2018 |
| CN | 110472430 A | 11/2019 |
| CN | 110493261 A | 11/2019 |

OTHER PUBLICATIONS

International Search Report in Application No. PCT/CN2020/078222, from the National Intellectual Property Administration, PRC, dated Dec. 7, 2020.

Written Opinion of the International Search Authority in International Application No. PCT/CN2020/078222, dated Dec. 7, 2020.

European Search Report in European Application No. 20725750.2, dated May 10, 2021.

* cited by examiner

METHODS AND DEVICES FOR GENERATING AND VERIFYING PASSWORDS

CROSS REFERENCE TO RELATED APPLICATIONS

This application is a continuation of International Application No. PCT/CN2020/078222, filed Mar. 6, 2020, the entire content of which is incorporated herein by reference.

TECHNICAL FIELD

The specification relates generally to computer technologies, and more particularly, to methods and devices for generating and verifying passwords.

BACKGROUND

A password, or a passcode, is a memorized secret used to confirm the identity of a user. A password may include a string of characters including letters, numbers, or other symbols.

Users may be required to provide passwords to confirm their identities in various situations, including, e.g., banking, checking electronic mails, logging into electronic devices, launching software applications, and the like. As such, a user may be required to memorize multiple passwords, which may be difficult, particularly if different passwords are used for different accounts. On the other hand, if the user uses the same or similar passwords for different accounts, it may significantly increase the risk of multiple accounts being compromised.

SUMMARY

In one aspect, a computer-implemented method for generating and verifying password includes: receiving a password setup request, the password setup request comprising a list identifying at least one verifier and data representing a user-provided password; forming a basis password based on the user-provided password; generating a plurality of system-generated passwords based on the basis password; encrypting the plurality of system-generated passwords to generate a plurality of encrypted passwords including a first encrypted password; submitting the plurality of encrypted passwords to a blockchain system for recordation; and providing a first address of the first encrypted password on the blockchain system to a first verifier identified in the list.

In another aspect, a device for generating and verifying password includes: one or more processors; and one or more computer-readable memories coupled to the one or more processors and having instructions stored thereon that are executable by the one or more processors to: receive a password setup request, the password setup request comprising a list identifying at least one verifier and data representing a user-provided password; form a basis password based on the user-provided password; generate a plurality of system-generated passwords based on the basis password; encrypt the plurality of system-generated passwords to generate a plurality of encrypted passwords including a first encrypted password; submit the plurality of encrypted passwords to a blockchain system for recordation; and provide a first address of the first encrypted password on the blockchain system to a first verifier identified in the list.

In still another aspect, a non-transitory computer-readable medium has stored therein instructions that, when executed by a processor of a device, cause the device to perform a method for generating and verifying password. The method includes: receiving a password setup request, the password setup request comprising a list identifying at least one verifier and data representing a user-provided password; forming a basis password based on the user-provided password; generating a plurality of system-generated passwords based on the basis password; encrypting the plurality of system-generated passwords to generate a plurality of encrypted passwords including a first encrypted password; submitting the plurality of encrypted passwords to a blockchain system for recordation; and providing a first address of the first encrypted password on the blockchain system to a first verifier identified in the list.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
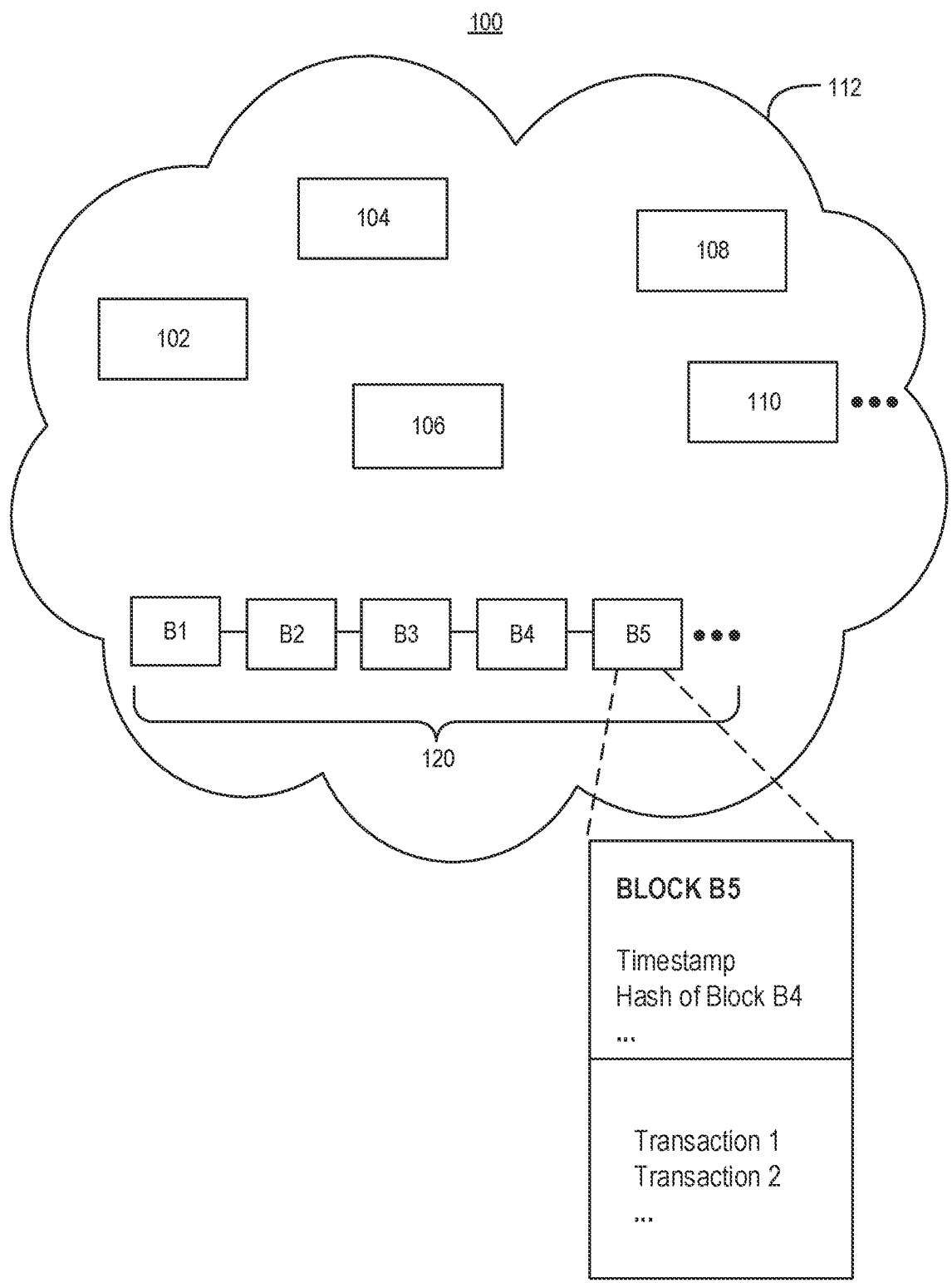
FIG. 1 is a schematic diagram of a blockchain system, according to an embodiment.

Embodiments of the specification provide methods and devices for generating and verifying passwords. The methods and devices support a password setup process and a password verification process. When operating in the password setup process, the methods and devices may receive a user-provided password, which may be expressed in any one of various formats, including, e.g., text-based, voice-based, or image-based formats. The methods and devices may generate multiple system-generated passwords based on the user-provided password. The methods and devices may encrypt the system-generated passwords, e.g., using a cryptographic hash function, and submit the encrypted passwords to a blockchain system for recordation. The methods and devices may provide addresses of one or more encrypted passwords to one or more password verifiers to complete the setup process. When operating in the password verification process, the methods and devices may receive a request indicating a target verifier and a user-provided password. The methods and devices may generate a plurality of encrypted passwords based on the user-provided password and provide one or more encrypted passwords to the target verifier to facilitate password verification by the target verifier.

Embodiments disclosed in the specification have one or more technical effects. In some embodiments, the methods and devices support various types of user-provided passwords. This allows the users to provide passwords in various formats, including, e.g., text-based, voice-based, or image-based formats, thereby improving usability. In some embodiments, the methods and devices generate multiple encrypted passwords and submit the multiple encrypted passwords to a blockchain system for recordation. This allows the encrypted passwords to be recorded securely and immutably. In some embodiments, the methods and devices provide addresses of one or more encrypted passwords to one or more password verifiers designated by a user. This allows the user to utilize the methods and devices to generate and manage passwords for multiple accounts, further improving usability. Moreover, because each password verifier receives one or more encrypted passwords, which are different from the original user-provided password, even if the encrypted passwords used by one of the password verifiers is comprised, the other password verifiers may remain secure, further improving security.

Blockchain systems, also known as distributed ledger systems (DLSs) or consensus systems, may enable participating parties to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system is implemented using a peer-to-peer (P2P) network, in which the nodes communicate directly with each other, e.g., without the need of a fixed, central server. Each node in the P2P network may initiate communication with another node in the P2P network. A blockchain system maintains one or more blockchains.

A blockchain is a data structure that stores data, e.g., transactions, in a way that may prevent tampering and manipulation of the data by malicious parties. The transactions stored in this manner may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. .Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
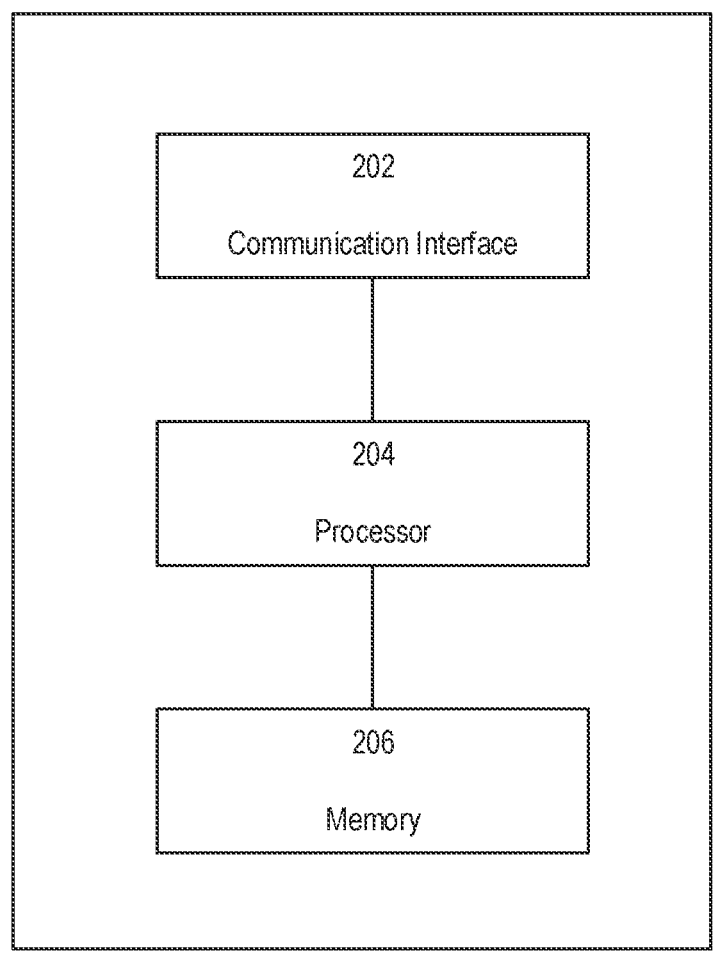
FIG. 2 is a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may store processor-executable instructions and data, such as a copy of the blockchain 120 (FIG. 1). The memory 206 may include any type of volatile or non-volatile memory devices, or a combination thereof such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Figure 3:
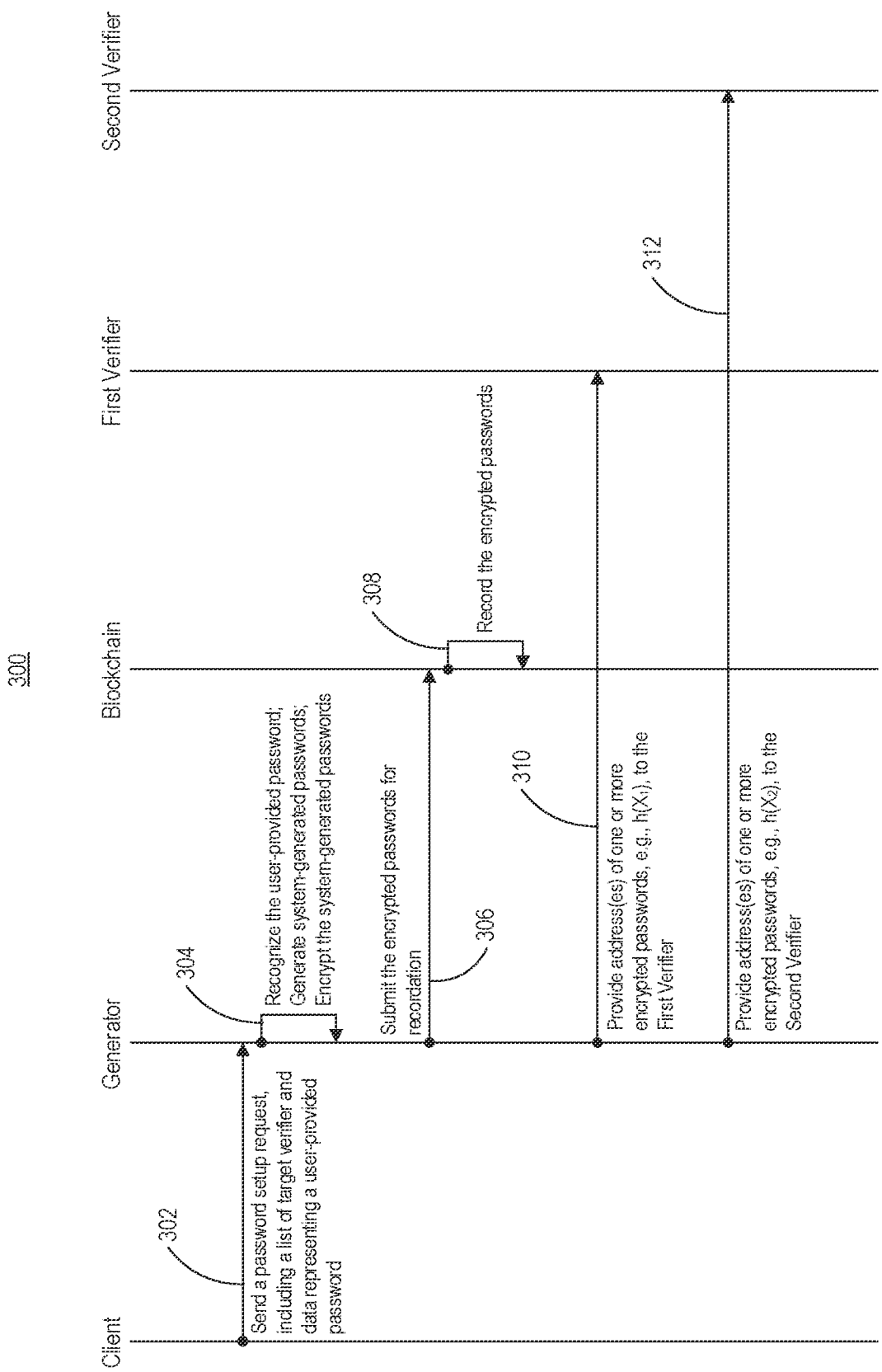
FIG. 3 is a flow chart of a method for generating passwords, according to an embodiment

FIG. 3 illustrates a flow chart of a method 300 for generating passwords according to an embodiment. Referring to FIG. 3, multiple users may have accounts on a Blockchain, e.g., the blockchain 120 (FIG. 1). The Blockchain may be implemented to support various types of users, or parties, including, e.g., individuals, businesses, service providers, manufacturers, as well as other types of companies, organizations, and the like.

For illustrative purposes, multiple users are depicted in FIG. 3, which includes a Client, a Generator, a First Verifier, and a Second Verifier. The Client may represent a user, e.g., an individual, who wants to utilize the method 300 to generate and manage passwords for various accounts. The Generator may represent a user, e.g., a business, a service platform, or a computing device operated by such a business or service platform, which may provide password generation and management services to the Client. The First Verifier may represent a user, e.g., a bank or a service provider, on which the Client has a first account that requires password verification. The Second Verifier may represent another user, e.g., another bank or another service provider, on which the Client has a second account that requires password verification. It is to be understood that the Client may have additional accounts hosted by additional verifiers. It is also to be understood that one of the verifiers may serve as the Generator. However, of illustrative purposes, the Generator is depicted separately from the verifiers.

At step 302, the Client may send a password setup request to the Generator. In some embodiments, the password setup request may include a list identifying one or more verifiers that the Client wants to setup using the method 300. For example, the list depicted in FIG. 3 may include the First Verifier and the Second Verifier. In some embodiments, the password setup request may also include data representing a user-provided password. The data may be provided in various formats, including, e.g., text-based, voice-based, or image-based formats.

At step 304, the Generator may process the data to recognize the user-provided password. If the data is text-based, for example, the text contained in the data may be recognized as the user-provided password. If the data is voice-based, the Generator may utilize one or more voice recognition techniques to recognize the user-provided password. if the data is image-based, the Generator may utilize one or more image recognition or optical character recognition techniques to recognize the user-provided password. Alternatively, or additionally, the Generator may recognize the voice or the image itself as the user-provided password. The Generator may also process the data in various other manners to recognize the user-provided password.

In some embodiments, the Generator may utilize the user-provided password as a basis password, which may then be utilized to generate one or more system-generated passwords. In some embodiments, the Generator may also generate an additional password, referred to as a generator-provided password, and utilize the generator-provided password in conjunction with the user-provided password to form the basis password. The generator-provided password may include, e.g., a signature or a string provided by the Generator. In some embodiments, the Generator may append the generator-provided password as a prefix or a postfix to the user-provided password to form the basis password. The Generator may also form the basis password in other manners using the generator-provided password and the user-provided password.

In some embodiments, the Generator may generate N system-generated passwords based on the basis password. In some embodiments, the value of N may be specified by the Client. In some embodiments, the value of N may be determined based on the number of verifiers identified in the list submitted along with the password setup request. In some embodiments, the value of N may be predetermined by the Generator.

In some embodiments, the Generator may generate N system-generated passwords by dividing the basis password into N segments. For example, suppose the basis password is denoted as X, then the Generator may divide X into N segments, including, e.g., $X_1, X_2, \ldots X_n$. It is to be understood, however, that dividing the basis password into N segments is merely presented as an example. It is to be understood that the Generator may generate N system-generated passwords using other techniques, including, e.g., using different combinations of characters or symbols contained in the basis password to form N system-generated passwords. For illustrative purposes, the following description will use $X_1, X_2, \ldots X_n$ to generally denote the system-generated passwords.

In some embodiments, the Generator may encrypt the system-generated passwords $X_1, X_2, \ldots X_n$. In some embodiments, the Generator may encrypt the system-generated passwords using a cryptographic hash function h( ) to generate encrypted passwords $h(X_1), h(X_2), \ldots h(X_n)$.

At step 306, the Generator may submit the encrypted passwords $h(X_1), h(X_2), \ldots h(X_n)$ to the Blockchain for recordation. In some embodiments, the Generator may submit the encrypted passwords $h(X_1), h(X_2), \ldots h(X_n)$ in a manner so that each encrypted password $h(X_i)$ is recorded at a unique address on the Blockchain. In this manner, each encrypted password $h(X_i)$ can be uniquely identified by its corresponding address. In some embodiments, the Generator may submit the encrypted passwords $h(X_1), h(X_2), \ldots h(X_n)$ to different blocks on the Blockchain.

At step 308, the Blockchain may record the encrypted passwords $h(X_1), h(X_2), \ldots h(X_n)$ as submitted by the Generator and provide the corresponding address for each encrypted password $h(X_i)$ to the Generator.

At step 310, the Generator may provide addresses of one or more encrypted passwords to the First Verifier. For example, the Generator may provide the address of the encrypted password $h(X_1)$ to the First Verifier, allowing the First Verifier to utilize the address of $h(X_1)$ to perform password verification (the verification process will be described below). Alternatively, the Generator may provide the addresses of encrypted passwords $h(X_i), h(X_j),$ and $h(X_k)$ to the First Verifier (i, j, and k being integers between 1 and n), allowing the First Verifier to utilize the addresses of $h(X_i), h(X_j),$ and $h(X_k)$ to perform password verification. It is to be understood that how many addresses to provide, and which addresses to provide, may vary depending on specific implementations.

Similarly, at step 312, the Generator may provide addresses of one or more encrypted passwords to the Second Verifier. For example, the Generator may provide the address of the encrypted password $h(X_2)$ to the Second Verifier, allowing the Second Verifier to utilize the address of $h(X_2)$ to perform password verification. Alternatively, the Generator may provide the addresses of encrypted passwords $h(X_1)$ and $h(X_m)$ to the Second Verifier (l and m being integers between 1 and n), allowing the Second Verifier to utilize the addresses of $h(X_1)$ and $h(X_m)$ to perform password verification.

In some embodiments, the Client may identify additional verifiers in the password setup request, in which case the Generator may repeat step 312 and provide addresses of one or more encrypted passwords to the additional verifiers.

Figure 4:
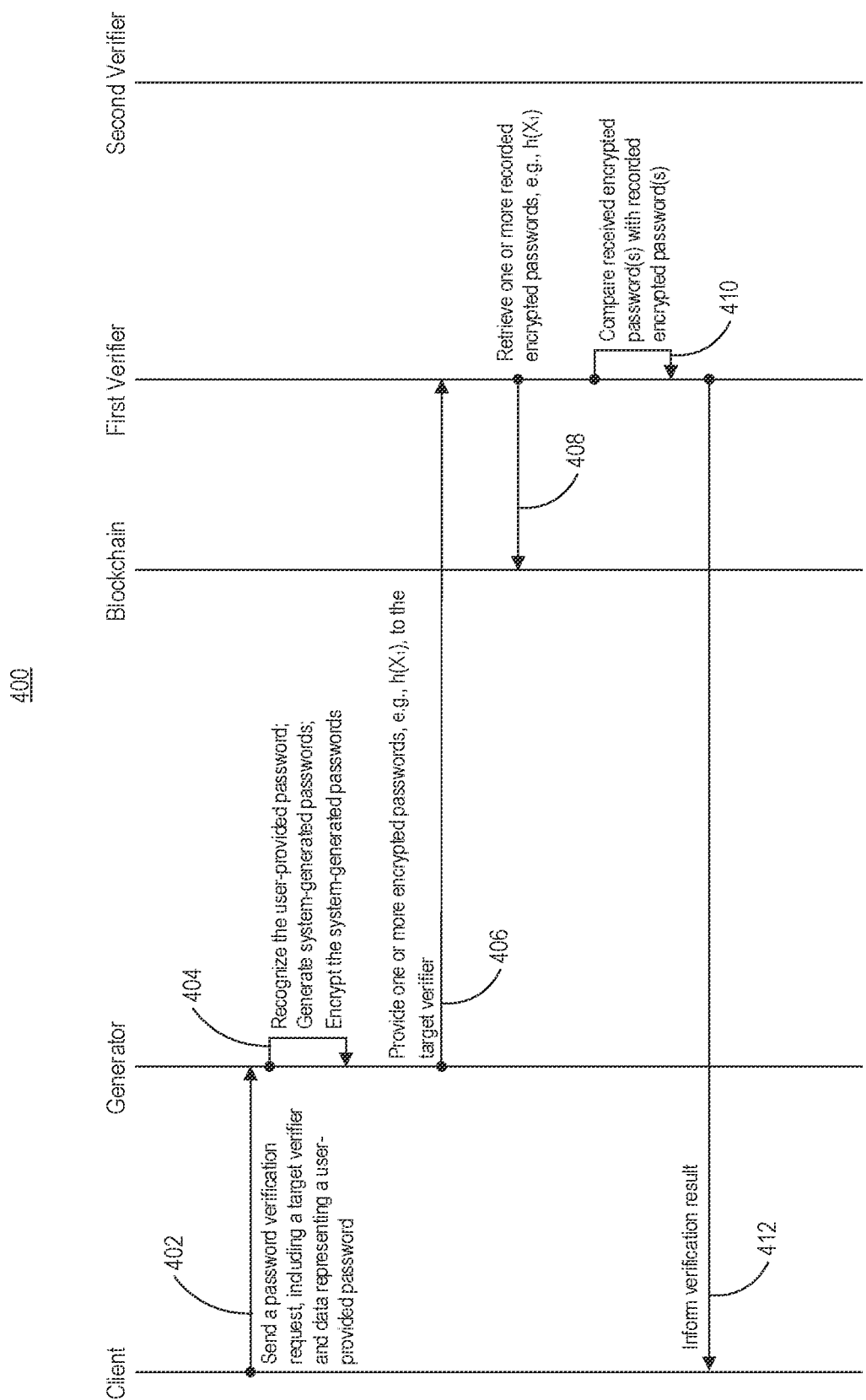
FIG. 4 is a flow chart of a method for verifying passwords, according to an embodiment.

FIG. 4 illustrates a flow chart of a method 400 for verifying passwords according to an embodiment. For illustrative purposes, the same users depicted in FIG. 3 are depicted in FIG. 4.

At step 402, the Client may send a password verification request to the Generator. The Client may send such a password verification request to the Generator when, for example, the Client wants to log into a password-protected account managed by the First Verifier. In some embodiments, the Client may identify the First Verifier as the target verifier in the password verification request. The password verification request may also include data representing a user-provided password. The data may be provided in various formats, including, e.g., text-based, voice-based, or image-based formats.

At step 404, the Generator may process the data to recognize the user-provided password. The Generator may also form a basis password, generate system-generated passwords $X_1, X_2, \ldots X_n$ using the basis password, and encrypt the system-generated passwords to generate encrypted passwords $h(X_1), h(X_2), \ldots h(X_n)$ in the same manner described above.

At step 406, the Generator may provide one or more encrypted passwords to the First Verifier to facilitate password verification by the First Verifier. In some embodiments, the Generator may determine which encrypted password(s) to provide to the First Verifier based on the execution of the method 300. For example, if the Generator previously provided the address of $h(X_1)$ to the First Verifier at step 310, the Generator may provide the encrypted password $h(X_1)$ to the First Verifier at step 406. Upon receiving the encrypted password $h(X_1)$, at step 408, the First Verifier may retrieve the recorded encrypted password $h(X_1)$ from the Blockchain using the previously received address. The First Verifier may then compare the received encrypted password $h(X_1)$ with the recorded encrypted password $h(X_1)$ at step 410. If the received encrypted password $h(X_1)$ matches the recorded encrypted password $h(X_1)$, then the First Verifier may deem the password verification successful. Otherwise, the First Verifier may deem the password verification unsuccessful. The First Verifier may inform the Client of the verification result at step 412.

In another example, if the Generator previously provided the addresses of $h(X_i), h(X_j),$ and $h(X_k)$ to the First Verifier at step 310, the Generator may provide the encrypted passwords $h(X_i), h(X_j),$ and $h(X_k)$ to the First Verifier at step 406. Upon receiving the encrypted passwords $h(X_i), h(X_j),$ and $h(X_k)$, at step 408, the First Verifier may retrieve the recorded encrypted passwords $h(X_i), h(X_j),$ and $h(X_k)$ from the Blockchain using the previously received addresses. The First Verifier may then compare each of the received encrypted passwords $h(X_i), h(X_j),$ and $h(X_k)$ with the recorded encrypted passwords $h(X_i), h(X_j),$ and $h(X_k)$ at step 410. If the received encrypted passwords $h(X_i), h(X_j),$ and $h(X_k)$ match the corresponding recorded encrypted passwords $h(X_i), h(X_j),$ and $h(X_k)$, then the First Verifier may deem the password verification successful. Otherwise, the First Verifier may deem the password verification unsuccessful. The First Verifier may inform the Client of the verification result at step 412.

It is to be understood that the Client may identify another verifier (e.g., the Second Verifier) as the target verifier and repeat step 402 in the same manner as described above. This allows the Client to use the same user-provided password for multiple accounts, effectively improving usability. Moreover, because each verifier only receives one or more encrypted passwords, which are different from the original user-provided password, even if the encrypted passwords used by one of the verifiers is comprised (e.g., if the First Verifier is hacked and $h(X_1)$ is compromised), the other verifiers may still remain secure. Furthermore, because the Generator generates the encrypted passwords based on the system-generated passwords, which are themselves different from the user-provided password, the Generator may introduce another layer of protection to further secure the user-provided password.

Figure 5:
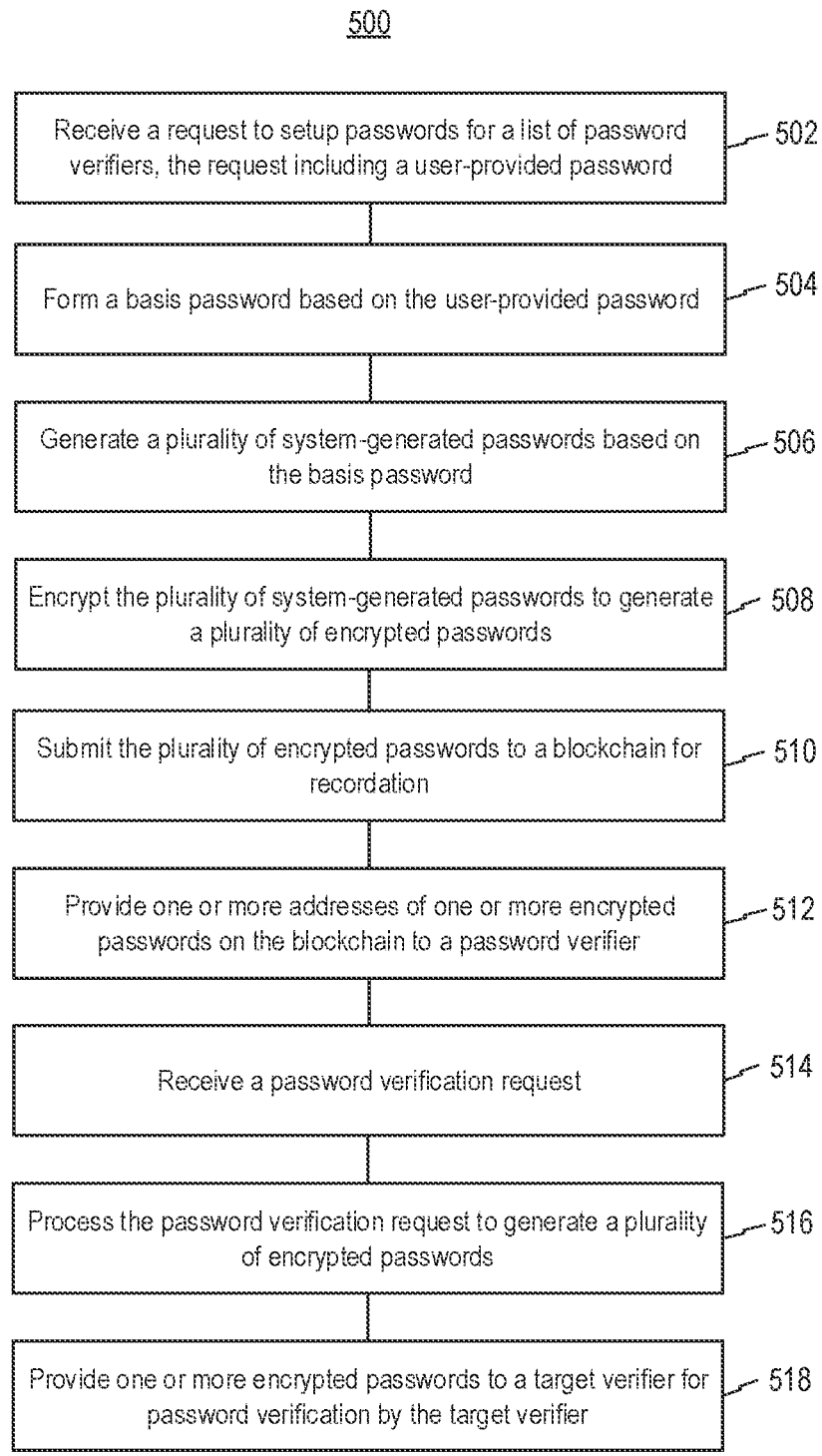
FIG. 5 is a flow chart of a method for generating and verifying passwords, according to an embodiment.

FIG. 5 illustrates a flow chart of a method 500 for generating and verifying passwords using a blockchain, e.g., the blockchain 120 (FIG. 1), according to an embodiment. The method 500 may be performed by one or more computing devices operated by a business or a service platform, which may correspond to the Generator in FIGS. 3 and 4. The computing device may be similar to the computing device 200 depicted in FIG. 2. The computing device may include a communication interface to communicate other computing devices, including the blockchain 120.

At step 502, the computing device may receive a password setup request from a user, e.g., the Client (FIG. 3). The password setup request may include a list identifying one or more verifiers that the Client wants to setup using the method 500. The password setup request may also include data representing a user-provided password. In some embodiments, the data may be provided in various formats, including, e.g., text-based, voice-based, or image-based formats. In some embodiments, the computing device may process the data to recognize the user-provided password. In some embodiments, the process may include a voice recognition process. In some embodiments, the process may include an image recognition or optical character recognition process.

At step 504, the computing device may form a basis password based on the user-provided password. In some embodiments, the computing device may utilize the user-provided password as a basis password. In some embodiments, the computing device may generate an additional password, e.g., the generator-provided password, and utilize the additional password in conjunction with the user-provided password to form the basis password.

At step 506, the computing device may generate a plurality of system-generated passwords based on the basis password. In some embodiments, the computing device may generate N system-generated passwords by dividing the basis password into N segments, including, e.g., $X_1$, $X_2$, ... $X_n$. It is to be understood, however, that dividing the basis password into N segments is merely presented as an example. The computing device may generate N system-generated passwords using other techniques.

At step 508, the computing device may encrypt the plurality of system-generated passwords to generate a plurality of encrypted passwords. In some embodiments, the computing device may encrypt the system-generated passwords using a cryptographic hash function h( ) to generate encrypted passwords $h(X_1)$, $h(X_2)$, ... $h(X_n)$.

At step 510, the computing device may submit the plurality of encrypted passwords to the blockchain 120 for recordation. In some embodiments, the computing device may submit the encrypted passwords $h(X_1)$, $h(X_2)$, ... $h(X_n)$ in a manner so that each encrypted password $h(X_i)$ is recorded at a unique address on the blockchain 120. In this manner, each encrypted password $h(X_i)$ can be uniquely identified by its corresponding address on the blockchain 120.

At step 512, the computing device may provide an address of an encrypted password to a verifier identified in the list of verifiers, e.g., the First Verifier (FIG. 3). In some embodiments, the computing device may provide a set of addresses corresponding to a set of encrypted passwords to a verifier. In some embodiments, the computing device may repeat step 512 to provide address(es) of one or more encrypted passwords to one or more additional verifiers identified in the list of verifiers, including, e.g., the Second Verifier (FIG. 3).

At step 514, the computing device may receive a password verification request from a user, e.g., the Client. In some embodiments, the password verification request may identify a verifier which the user considers to be the target verifier. The password verification request may also include data representing a user-provided password which the user is attempting to use to perform the verification.

At step 516, the computing device may process the password verification request. In some embodiments, the computing device may repeat the steps of forming the basis password based on the user-provided password, generating the plurality of system-generated passwords based on the basis password, and encrypting the plurality of system-generated passwords to generate the plurality of encrypted passwords. If the user-provided password received at step 511 matches that provided at step 502, then the plurality of encrypted passwords generated at step 516 may match the plurality of encrypted passwords generated at step 508. Otherwise, the plurality of encrypted passwords generated at step 516 may not match the plurality of encrypted passwords generated at step 508.

At step 518, the computing device may provide one or more encrypted passwords to the target verifier, e.g., the First Verifier (FIG. 4). In some embodiments, the computing device may determine which encrypted password(s) to provide to the target verifier based on the execution of step 512. In some embodiments, the computing device may keep a record indicating which address(es) the computing device had previously provided to the target verifier. For example, if the computing device had previously provided the address of $h(X_1)$ to the target verifier at step 512, the computing device may provide the corresponding encrypted password $h(X_1)$ to the target verifier at step 518 to facilitate password verification by the target verifier. In this manner, upon receiving the encrypted passwords from the computing device, the target verifier may retrieve the recorded encrypted password $h(X_1)$ from the blockchain 120 using the previously received address and compare the received encrypted password $h(X_1)$ with the recorded encrypted password $h(X_1)$. If the received encrypted password $h(X_1)$ matches the recorded encrypted password $h(X_1)$, then the target verifier may deem the password verification successful. Otherwise, the target verifier may deem the password verification unsuccessful.

Figure 6:
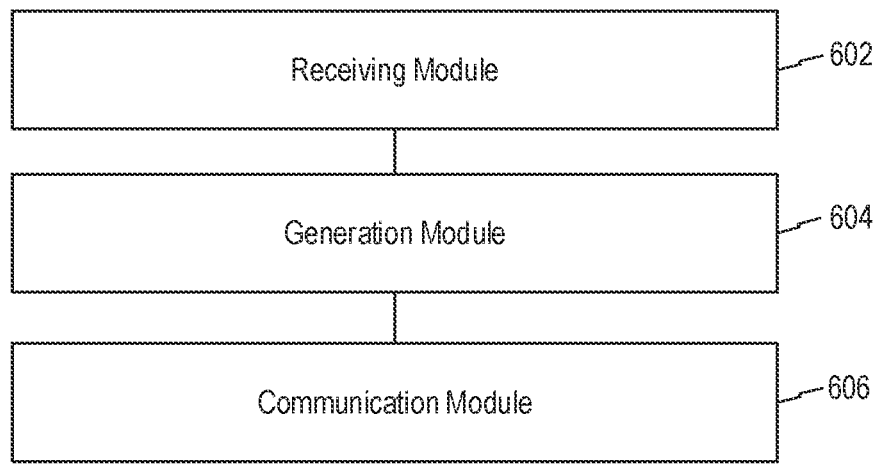
FIG. 6 is a block diagram of an apparatus for generating and verifying passwords, according to an embodiment.

FIG. 6 is a block diagram of an apparatus 600 for generating and verifying passwords, according to an embodiment. For example, the apparatus 600 may be an implementation of a software process, and may correspond to the method 500 (FIG. 5). Referring to FIG. 6, the apparatus 600 may include a receiving module 602, a generation module 604, and a communication module 606.

The receiving module 602 may receive data representing a user-provided password from a user. In some embodiments, the data may be provided in various formats, including, e.g., text-based, voice-based, or image-based formats. In some embodiments, the receiving module 602 may process the data to recognize the user-provided password. The receiving module 602 may provide the user-provided password to the generation module 604.

The generation module 604 may generate a plurality of encrypted passwords based on the user-provided password. In some embodiments, the generation module 604 may form a basis password based on the user-provided password and utilize the basis password to generate a plurality of system-generated passwords, which may then be encrypted to generate the plurality of encrypted passwords. In some embodiments, the generation module 604 may generate an additional password, e.g., a generator-provided password, and utilize the additional password in conjunction with the user-provided password to form the basis password.

The generation module 604 may submit to the encrypted passwords to a storage system, e.g., a blockchain system, for recordation. The receiving module 602 may then receive information regarding the addresses at which the encrypted passwords are recorded. The receiving module 602 may provide the addresses to the communication module 606, which may provide one or more addresses of one or more encrypted passwords to one or more verifiers.

The receiving module 602 may also receive a password verification request. The receiving module 602 may provide the password verification request to the generation module 604 which may process the request to generate a plurality of encrypted passwords. The generation module 604 may provide the encrypted passwords to the communication module 606, which may provide one or more encrypted passwords to a target verifier to facilitate password verification as described above.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 600 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 600, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A computer-implemented method for generating and verifying password, the method comprising:
   receiving a password setup request, the password setup request comprising a list identifying at least two verifiers and data representing a user-provided password;

forming a basis password based on the user-provided password;
generating a plurality of system-generated passwords based on the basis password;
encrypting the plurality of system-generated passwords to generate a plurality of encrypted system-generated passwords including a first encrypted system-generated password and a second encrypted system-generated password;
submitting the plurality of encrypted system-generated passwords to a blockchain system for recordation;
providing a first address of the first encrypted system-generated password on the blockchain system to a first verifier identified in the list; and
providing a second address of the second encrypted system-generated password on the blockchain system to a second verifier identified in the list.

2. The method of claim 1, further comprising:
receiving a password verification request, the password verification request identifying the first verifier as a target verifier and comprising data representing the user- provided password;
forming the basis password based on the user-provided password in the password verification request;
generating the plurality of system-generated passwords based on the basis password;
encrypting the plurality of system-generated passwords to generate the plurality of encrypted system-generated passwords including the first encrypted system- generated password; and
providing the first encrypted system-generated password to the first verifier for password verification by the first verifier.

3. The method of claim 2, wherein the password verification is deemed successful when the first encrypted system-generated password provided to the first verifier matches the first encrypted system-generated password recorded at the first address.

4. The method of claim 1, further comprising:
processing the data representing the user-provided password to recognize the user-provided password.

5. The method of claim 4, wherein the processing comprises voice recognition.

6. The method of claim 4, wherein the processing comprises image recognition.

7. The method of claim 1, wherein forming the basis password based on the user-provided password further comprises:
generating an additional password; and
utilizing the additional password in conjunction with the user-provided password to form the basis password.

8. The method of claim 1, wherein each of the plurality of encrypted system-generated passwords is recorded at a unique address on the blockchain system.

9. The method of claim 1, wherein the first address is one of a set of addresses provided to the first verifier, wherein the set of addresses correspond to a set of encrypted passwords.

10. A device for generating and verifying password, comprising:
one or more processors; and
one or more computer-readable memories coupled to the one or more processors and having instructions stored thereon that are executable by the one or more processors,
wherein the one or more processors are configured to:
receive a password setup request, the password setup request comprising a list identifying at least two verifiers and data representing a user-provided password;
form a basis password based on the user-provided password;
generate a plurality of system-generated passwords based on the basis password;
encrypt the plurality of system-generated passwords to generate a plurality of encrypted system-generated passwords including a first encrypted system-generated password and a second encrypted system-generated password;
submit the plurality of encrypted system-generated passwords to a blockchain system for recordation;
provide a first address of the first encrypted system-generated password on the blockchain system to a first verifier identified in the list; and
provide a second address of the second encrypted system-generated password on the blockchain system to a second verifier identified in the list.

11. The device of claim 10, wherein the one or more processors are further configured to:
receive a password verification request, the password verification request identifying the first verifier as a target verifier and comprising data representing the user- provided password;
form the basis password based on the user-provided password in the password verification request;
generate the plurality of system-generated passwords based on the basis password;
encrypt the plurality of system-generated passwords to generate the plurality of encrypted system-generated passwords including the first encrypted system-generated password; and
provide the first encrypted system-generated password to the first verifier for password verification by the first verifier.

12. The device of claim 11, wherein the password verification is deemed successful when the first encrypted system-generated password provided to the first verifier matches the first encrypted system-generated password recorded at the first address.

13. The device of claim 10, wherein the one or more processors are further configured to:
process the data representing the user-provided password to recognize the user- provided password.

14. The device of claim 13, wherein processing the data comprises voice recognition.

15. The device of claim 13, wherein processing the data comprises image recognition.

16. The device of claim 10, wherein in forming the basis password based on the user-provided password, the one or more processors are further configured to:
generate an additional password; and
utilize the additional password in conjunction with the user-provided password to form the basis password.

17. The device of claim 10, wherein each of the plurality of encrypted system-generated passwords is recorded at a unique address on the blockchain system.

18. A non-transitory computer-readable medium having stored therein instructions that, when executed by a processor of a device, cause the device to perform a method for generating and verifying password, the method comprising:
receiving a password setup request, the password setup request comprising a list identifying at least two verifiers and data representing a user-provided password;

forming a basis password based on the user-provided password;

generating a plurality of system-generated passwords based on the basis password;

encrypting the plurality of system-generated passwords to generate a plurality of encrypted system-generated passwords including a first encrypted system-generated password and a second encrypted system-generated password;

submitting the plurality of encrypted system-generated passwords to a blockchain system for recordation;

providing a first address of the first encrypted system-generated password on the blockchain system to a first verifier identified in the list; and providing a second address of the second encrypted system-generated password on the blockchain system to a second verifier identified in the list.

* * * * *